July 10, 1928.
M. L. REED ET AL
1,677,050
PARAFFIN CUTTER
Filed June 13, 1927
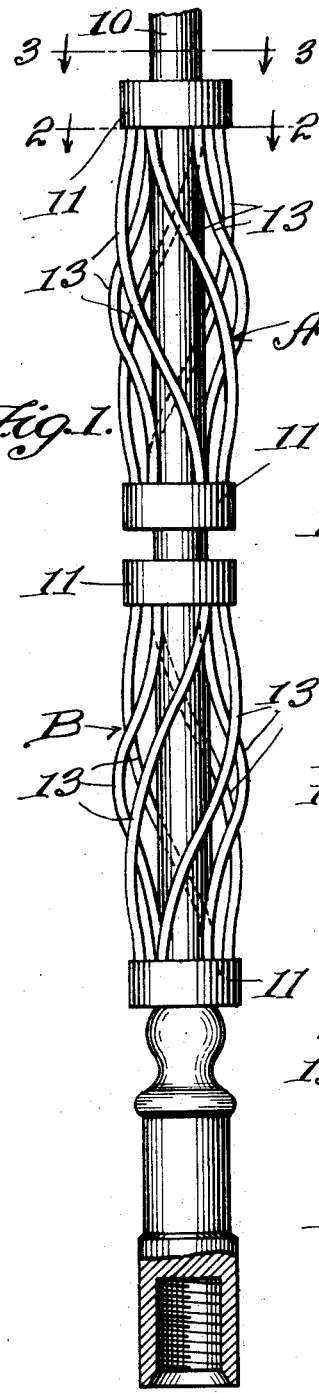
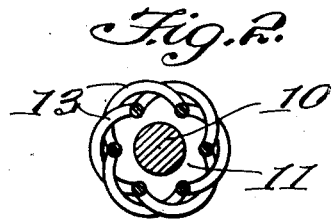
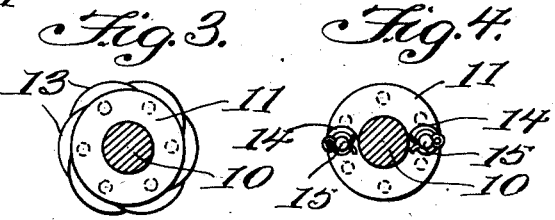
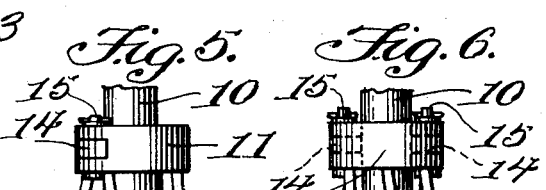
Martin L. Reed
Horace E. Bulla
INVENTOR
BY Victor J. Evans
ATTORNEY
WITNESS: J. T. L. Wright Patented July 10, 1928.

1,677,050

UNITED STATES PATENT OFFICE.

MARTIN L. REED AND HORACE E. BULLA, OF WILSON, OKLAHOMA.

PARAFFIN CUTTER.

Application filed June 13, 1927. Serial No. 198,523.

This invention contemplates the provision of a paraffin cutter primarily intended to remove accumulated paraffin in oil wells, in a quick and convenient manner, the invention being in the nature of an attachment for the pumping rod, and designed to provide for a reverse action in use.

In carrying out the invention we also contemplate a construction which is capable of being easily and quickly attached to or removed from the pumping rod as the occasion may require.

The nature and advantages of the invention will be better understood when the following detailed description is read in connection with the accompanying drawings, the invention residing in the construction, combination and arrangement of parts as claimed.

In the drawing forming part of this application, like numerals of reference indicate similar parts in the several views, and wherein:

Figure 1 is a view showing the application of the invention to a pumping rod.

Figure 2 is a sectional view on line 2—2 of Figure 1.

Figure 3 is a sectional view on line 3—3 of Figure 1.

Figure 4 is a top plan view of Figure 6.

Figure 5 is a view of a modified construction.

Figure 6 is a similar view looking at the attachment from a different angle.

Referring to the drawing in detail, 10 indicates a pumping rod of any well known or ordinary construction, while A and B indicate respectively the devices forming the subject matter of the present invention. There are two of these devices illustrated in the drawing, the devices being used in pairs, although it is to be understood that any number of pairs may be employed with a single rod as the occasion may require.

Each device includes spaced collars 11 which are connected together by spirally shaped rods 13, the latter preferably having their ends riveted, although they may be otherwise suitably secured to the collars without departing from the inventive idea. These rods 13 may also vary in cross sectional configuration without departing from the invention, and may also vary in the length and numbers in a given device, as may be found most suitable for the purpose intended. As shown in Figure 1, the devices are arranged upon the rod 10 one above the other, the rods 13 of the device B being coiled or spirally wound in a direction opposite the direction taken by the rod 13 of the device A, so that when in use, a reverse cutting action is provided for, thereby effectively removing the paraffin from the oil well as will be readily understood. The collars 11 may be made in one piece so that the devices can be slipped upon the rod 10, or the collars may be constructed as illustrated in Figures 4 to 6 inclusive. In these figures it will be noted that each collar is made in section which are pivoted as at 14, the meeting ends of the respective sections having a tongue and groove connection which are further secured by a removable pin 15. These collars are loose around the rod 10 and do not interfere with the pumping of the well, but when the rods are pulled, the cutters or devices set, with its reverse cutting action, quickly cut up and loosen the accumulated paraffin from the tubing at the same time the rods are pulled.

While it is believed that from the foregoing description the nature and advantages of the invention will be readily apparent, we desire to have it known that we do not limit ourselves to what is herein shown and described, and that such changes may be resorted to when desired as fall within the scope of what is claimed.

What we claim is:

The combination with a pumping rod, of a pair of paraffin cutters mounted upon the rod in superimposed relation, each cutter including a pair of spaced collars adapted to loosely surround the rod, and a plurality of spirally arranged cutting rods terminally connected with each pair of said collars, with the rods of one cutter reversely disposed with respect to those of the other cutter, and each of said collars including pivoted sections, a tongue and groove connection between the meeting ends of said sections, and a removable pin for holding said sections associated.

In testimony whereof we affix our signatures.

MARTIN L. REED.
HORACE E. BULLA.